(12) United States Patent
Khasnis

(10) Patent No.: US 9,231,710 B2
(45) Date of Patent: Jan. 5, 2016

(54) SYSTEM AND METHOD FOR REDUCING ON-CHIP MEMORY FOR FRAME BUFFER STORAGE IN WCDMA RECEIVER

(71) Applicant: Signalchip Innovations Private Limited, Bangalore (IN)

(72) Inventor: Himamshu Gopalakrishna Khasnis, Bangalore (IN)

(73) Assignee: Signalchip Innovations Private Limited, Bangalore (IN)

( * ) Notice: Subject to any disclaimer, the term of this patent is extended or adjusted under 35 U.S.C. 154(b) by 0 days.

(21) Appl. No.: 14/154,404

(22) Filed: Jan. 14, 2014

(65) Prior Publication Data

US 2015/0249508 A1  Sep. 3, 2015

(30) Foreign Application Priority Data

Nov. 18, 2013  (IN) .......................... 5312/CHE/2013

(51) Int. Cl.
*H04B 14/04*  (2006.01)
(52) U.S. Cl.
CPC ................................... *H04B 14/046* (2013.01)
(58) Field of Classification Search
USPC .......................................... 375/147, 148, 149
See application file for complete search history.

(56) References Cited

U.S. PATENT DOCUMENTS

| 2003/0035467 | A1* | 2/2003 | Shimizu | 375/147 |
| 2008/0013654 | A1* | 1/2008 | Rick et al. | 375/345 |
| 2008/0055132 | A1* | 3/2008 | Chien et al. | 341/143 |
| 2009/0190633 | A1* | 7/2009 | Smith | 375/148 |

* cited by examiner

*Primary Examiner* — Kabir A Timory
(74) *Attorney, Agent, or Firm* — The Law Office of Austin Bonderer, PC; D. Austin Bonderer

(57) ABSTRACT

A method of reducing an on-chip memory associated with storing frame buffer in WCDMA receiver includes obtaining, at a WCDMA front end receiver, an signal, transmitting, by an analog to digital convertor, input samples to a digital to digital sigma-delta converter, converting, by a sample rate convertor, a sampling rate associated with the input samples to a desired sampling rate for a rake receiver, quantizing, by the digital to digital sigma-delta converter, the input samples with a first number of bits to a converted data samples of a reduced number of bits, storing, at a memory unit, the converted data samples of the reduced number of bits, filtering the noise from the converted data samples to obtain a noise filtered converted data samples of the reduced number of bits, and decoding, at a WCDMA receiver processing unit, the noise filtered converted data samples over an entire radio frame.

8 Claims, 6 Drawing Sheets

SYSTEM AND METHOD FOR REDUCING ON-CHIP MEMORY FOR FRAME BUFFER STORAGE IN WCDMA RECEIVER

This application claims priority to Indian patent application no. 5312/CHE/2013 filed on Nov. 18, 2013, the complete disclosure of which, in its entirely, is herein incorporated by reference.

BACKGROUND

1. Technical Field

The embodiments herein generally relate to a Wideband Code Division Multiple Access (WCDMA) receiver, and, more particularly, to a system and method for reducing on-chip memory for frame buffer storage in a WCDMA receiver.

2. Description of the Related Art

WCDMA (Wireless Code Division Multiple Access) is a widely adapted third generation air interface. In third generation systems, every implementation has a transmitter and a receiver. For example, a WCDMA system typically includes a WCDMA transmitter part and a WCDMA receiver. In the WCDMA transmitter, data bits and control bits are transmitted in parallel using different orthogonal variable spreading factor (OVSF) codes. However, decoding of the data bits in the WCDMA receiver cannot be started unless Transport Format Control Indicator (TFCI) control bits are decoded over an entire radio frame. This requires storage of received samples at the output of an analog to digital converter (ADC) for the entire radio frame.

Also, for granular delay search of a multipath in the receiver, it is usually necessary to have samples at the output of the analog to digital converter (ADC) at a rate higher than the Nyquist rate (Oversampling). This translates to an enormous amount of storage requirement before the receiver processes these received samples. Accordingly, there remains a need for a system to reduce the storage requirement before the receiver for representing samples without degrading quality of received samples and without loss in the receiver performance.

SUMMARY

In view of the foregoing, an embodiment herein provides a system for reducing an on-chip memory associated with storing frame buffer. The system includes (i) a WCDMA receiver. The WCDMA receiver includes (a) a WCDMA front end receiver, (b) an analog to digital convertor that generates input samples to a digital to digital sigma-delta converter, (c) a sample rate convertor that converts a sampling rate associated with the input samples to a desired sampling rate for a rake receiver, (d) the digital to digital sigma-delta converter that quantize the input samples with a first number of bits to a converted data samples of reduced number of bits, (e) a memory unit that stores the converted data samples of the reduced number of bits, and (f) a digital low pass filter that filters the noise from the converted data samples to obtain noise filtered converted data samples of the reduced number of bits. The input samples include one or more bit per input sample. A noise is introduced when the input samples are converted to the converted data samples.

The digital to digital sigma delta converter may convert the input samples to the converted data samples. The input samples may include high number of bits (X bits). The converted data samples may include lesser number of bits (Y bits). A memory associated with storing the reduced number of bits may be lesser than a memory associated with storing the first number of bits. The system may further include a radio frame of spread encoded data bits may be transmitted over at least one physical channel. The system may further include data bits which are encoded and oversampled may be communicated to the WCDMA receiver. The system may further include the noise filtered converted data samples may be decoded over an entire radio frame.

In another aspect, a system for reducing an on-chip memory associated with storing frame buffer in WCDMA receiver is provided. The system includes (i) a WCDMA transmitter that transmits an signal to the WCDMA receiver, (ii) The WCDMA receiver includes (a) a WCDMA front end receiver, (b) an analog to digital convertor generates input samples to a digital to digital sigma-delta converter, (c) a sample rate convertor that converts a sampling rate associated with the input samples to a desired sampling rate for a rake receiver, (d) the digital to digital sigma-delta converter that quantize the input samples with a first number of bits to a converted data samples of reduced number of bits, (e) a memory unit that stores the converted data samples with the reduced number of bits, (f) a digital low pass filter that filters the noise from the converted data samples to obtain a noise filtered converted data samples of the reduced number of bits, and (g) a WCDMA receiver processing unit that receives the noise filtered converted data samples which are decoded over an entire radio frame.

The input samples include one or more bit per input sample. A noise is introduced when the input samples are converted to the converted data samples. A memory associated with storing the reduced number of bits is lesser than a memory associated with storing the first number of bits. The digital to digital sigma delta converter may convert the input samples to the converted data samples. The input samples may include high number of bits (X bits). The converted data samples may include less number of bits (Y bits).

In yet another aspect, a method of reducing an on-chip memory associated with storing frame buffer in WCDMA receiver is provided. The method include (i) obtaining, at a WCDMA front end receiver, an signal, (ii) generating, by an analog to digital convertor, input samples to a digital to digital sigma-delta converter, (iii) converting, by a sample rate convertor, a sampling rate associated with the input samples to a desired sampling rate for a rake receiver, (iv) quantizing, by the digital to digital sigma-delta converter, the input samples with a first number of bits to a converted data samples of a reduced number of bits, (v) storing, at a memory unit, the converted data samples with the reduced number of bits, (vi) filtering the noise from the converted data samples to obtain a noise filtered converted data samples of the reduced number of bits, and (vii) decoding, at a WCDMA receiver processing unit, the noise filtered converted data samples over an entire radio frame. The input samples include one or more bit per input sample. A noise is introduced when the input samples are converted to the converted data samples. The method may further include transmitting, input samples to the digital to digital sigma-delta converter, when the sampling rate corresponds to a sampling rate of the rake receiver.

The digital to digital sigma delta converter that may convert the input samples to the converted data samples. The input samples may include high number of bits (X bits). The converted data samples may include lesser number of bits (Y bits). A memory associated with storing the reduced number of bits may be lesser than a memory associated with storing the first number of bits. The method may further include a radio frame of spread encoded data bits that may be transmitted over at least one physical channel. The method may further include data bits which are encoded and oversampled may be communicated to the WCDMA receiver. The method may further include the noise filtered converted data samples are decoded over an entire radio frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1A:
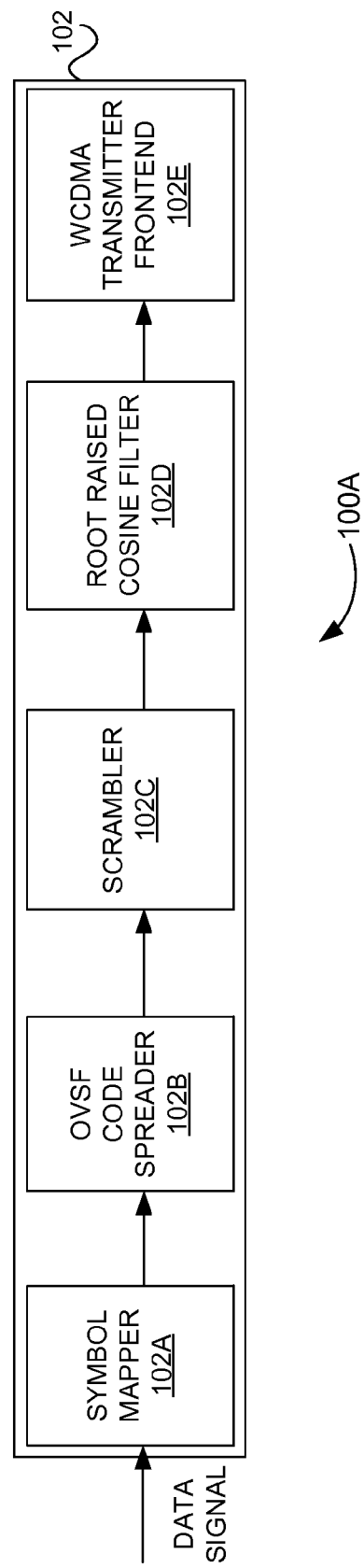
FIG. 1A is a block diagram illustrating a WCDMA transmitter according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system to reduce a storage requirement before the receiver for representing samples, without degrading quality of the received samples and thereby without any loss in the receiver performance. The embodiments herein achieve this by providing a system for reducing the on-chip memory associated with storing frame buffer in WCDMA receiver. Referring now to the drawings, and more particularly to FIGS. 1A through 5, where similar reference characters denote corresponding features consistently throughout the figures, there are shown preferred embodiments.

FIG. 1A is a block diagram 100A illustrating a WCDMA transmitter 102 according to an embodiment herein. The WCDMA transmitter 102 receives one or more streams of encoded voice or data signal as an input. An input to WCDMA transmitter 102 may be provided in transport blocks at every transport time interval (TTI) from a higher layer. The WCDMA transmitter 102 further includes a symbol mapper 102A, an OVSF (orthogonal variable spreading factor) code spreader 102B, a scrambler 102C, a root raised cosine filter 102D, and a WCDMA transmitter frontend 102E. The symbol mapper 102A groups one or more information bits and maps them to a symbol.

The OVSF code spreader 102B may multiply a copy inserted data sequence with a channelization code to produce a sequence of chips. In one embodiment, one or more channelization codes (e.g., OVSF codes) supported in WCDMA are used, which preserves orthogonality between different physical channels of a user. The scrambler 102C may scrambles the data by employing one or more scrambling codes to separate one or more users on an uplink. The scrambler 102C may enable separating one or more Node B (base stations) on a downlink by employing one or more scrambling codes.

Gold codes, which are constructed using a pair of maximal length sequences, may be used as scrambling codes. The root raised cosine filter 102D may provide the symbol shape and spectral containment for the transmitted signal. The raised cosine filter 102D may be split into two root raised cosine filters, one each at a WCDMA transmitter and a WCDMA receiver, as a matched filter. In one embodiment, the output of the root raised cosine (RRC) filter 102D is converted to analog through a digital to analog convertor (DAC). The digital to analog convertor (DAC) output is then sent through a WCDMA transmitter frontend that further conditions the signal and up converts it to radio frequencies and transmits the signal over air. In one embodiment, one or more control bits are spread based on a spreading factor. The spreading factor for a control channel may be much higher than the spreading factor for one or more data channels. In one embodiment, at WCDMA transmitter 102, a control channel carries one or more pilot bits support for channel estimation and Transport format control indicator (TFCI) bits for decoding one or more data channels.

Figure 1B:
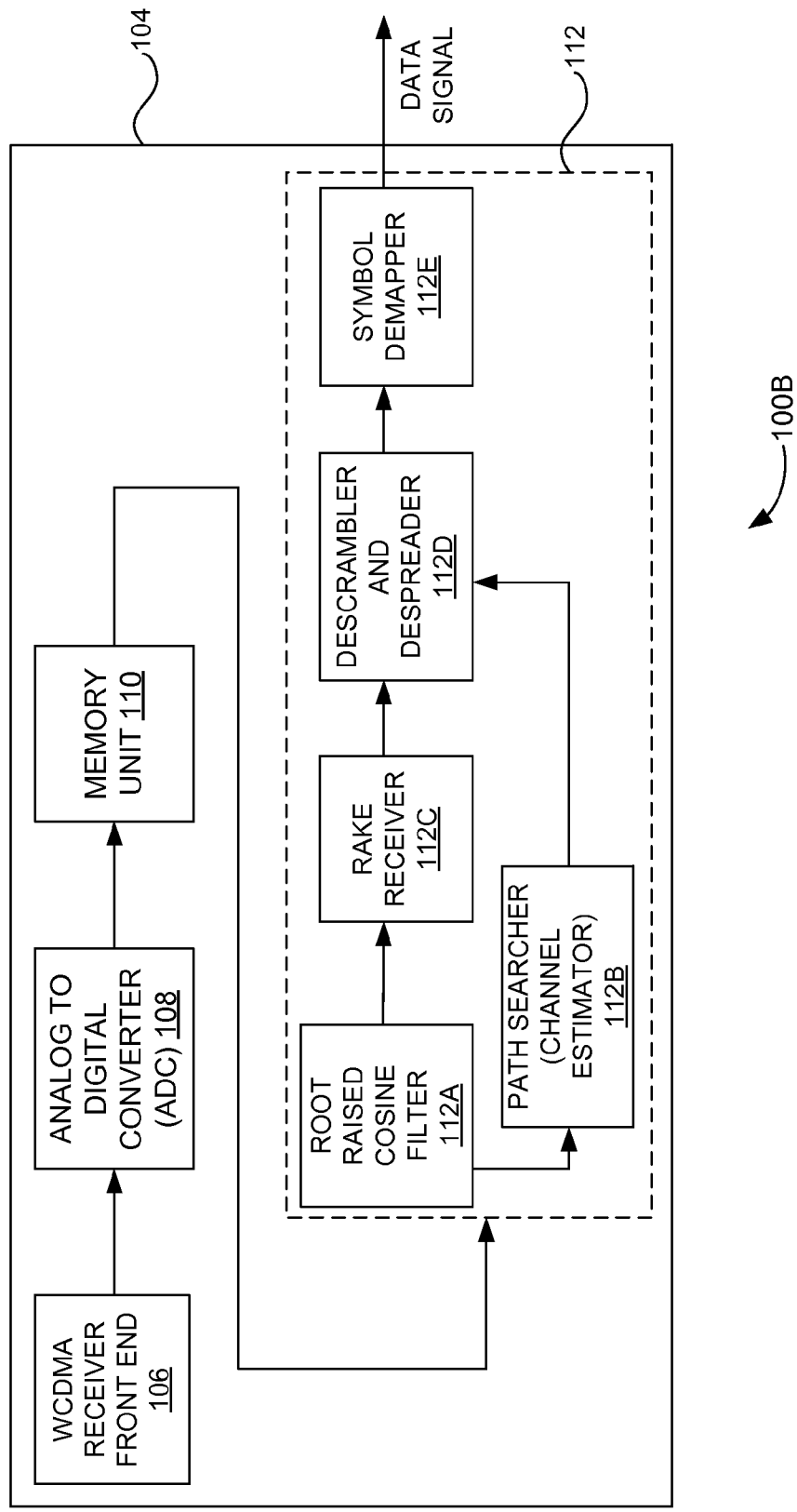
FIG. 1B is a block diagram illustrating a WCDMA receiver according to an embodiment herein.

FIG. 1B is a block diagram illustrating a WCDMA receiver 104 according to an embodiment herein. The WCDMA receiver 104 includes a WCDMA receiver front end 106, an analog to digital converter (ADC) 108, a memory unit 110 and a WCDMA receiver processing unit 112. The WCDMA receiver processing unit 112 further includes a root raised cosine filter 112A, a path searcher (channel estimator) 112B, a rake receiver 112C, a descrambler and despreader 112D, and a symbol demapper 112E. The path searcher 112B acts as a channel estimator for determining a delay, amplitude and phase of each path. For example, a signal propagating through a wireless channel may arrive directly or with multiple reflections at a WCDMA receiver 104.

The rake receiver 112C may receive the channel estimation parameters determined by the path searcher 112B to combine the different multipath reflections of the signal and add them coherently or non-coherently using maximal ratio combining or any other combining technique. The combined signal may have a higher signal to noise ratio and the interference due to multipath propagation is minimized. The scrambling codes may be nearly orthogonal over long lengths that reduce the interference from other users or base stations. The descrambled sequence may be multiplied with orthogonal channelization codes to separate the different physical channels of a user. In one embodiment, at the symbol demapper 112E received symbols are demapped to information bits based on different decision thresholds.

Figure 2:
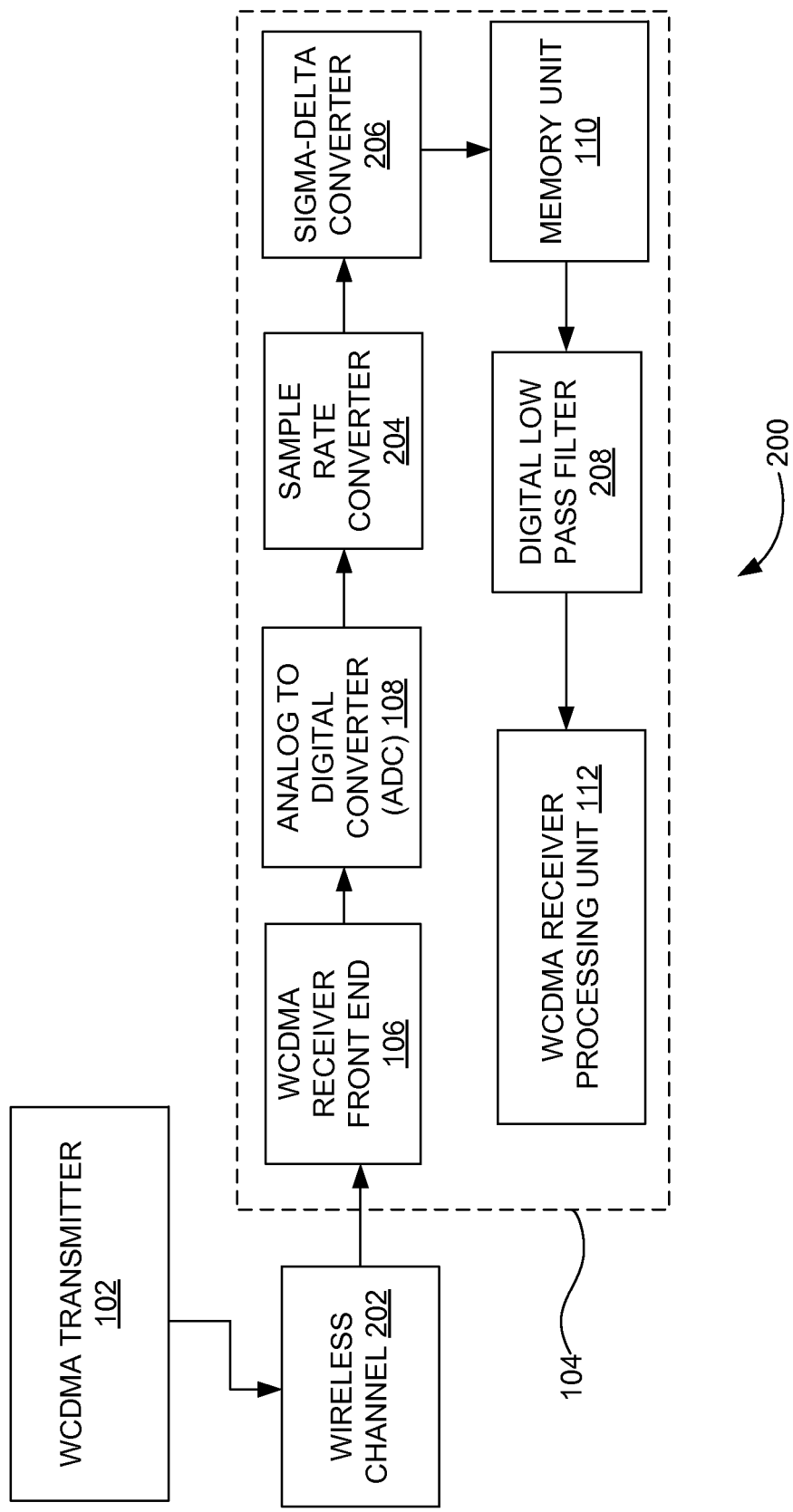
FIG. 2 is a block diagram illustrates a system for reducing an on-chip memory associated with storing frame buffers in the WCDMA receiver of FIG. 1B according to an embodiment herein.
Figure 3:
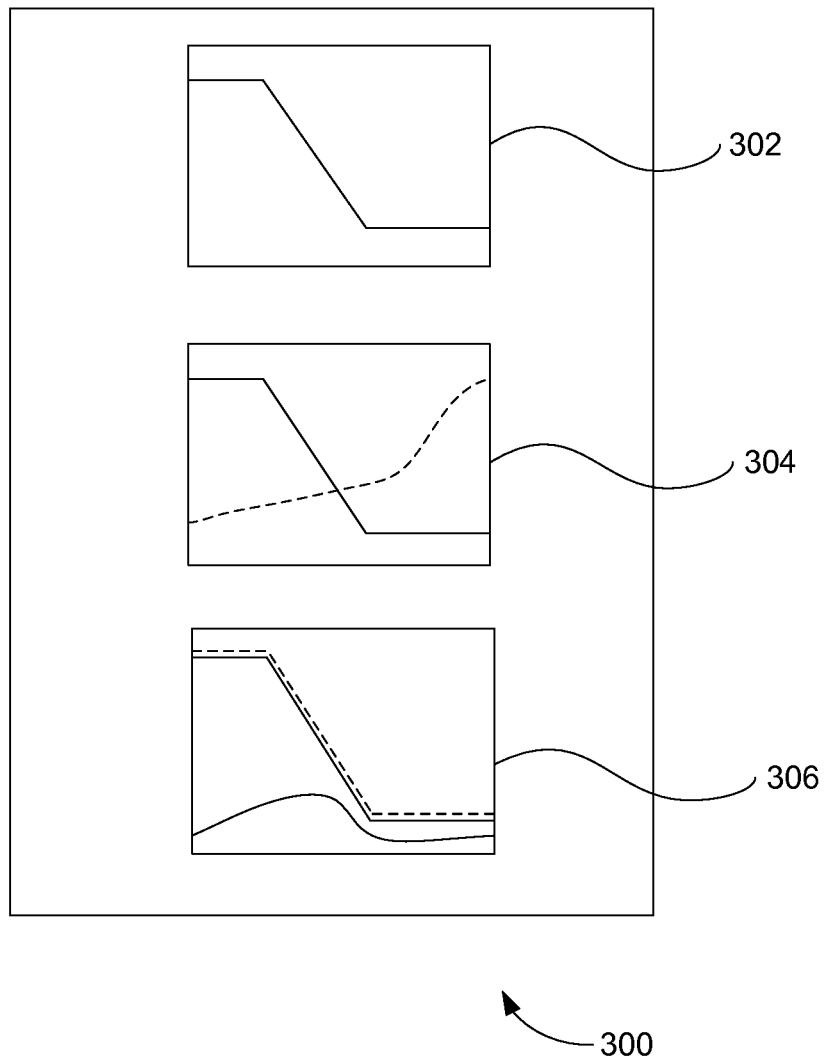
FIG. 3 is a graphical view that illustrates frequency spectra at various stages of the WCDMA front end receiver of FIG. 2 according to an embodiment herein.

FIG. 2 is a block diagram 200 illustrates a system for reducing an on-chip memory associated with storing frame buffers in the WCDMA receiver 104 of FIG. 1B according to an embodiment herein. The block diagram 200 includes the WCDMA transmitter 102, a wireless channel 202, and the WCDMA receiver 104. The WCDMA receiver 104 further includes the WCDMA front end receiver 106, the analog to digital converter (ADC) 108, a sample rate converter 204, a digital to digital sigma-delta converter 206, a memory unit 110, a digital low pass filter 208, and the WCDMA receiver processing unit 112. The WCDMA transmitter 102 may receive one or more streams of encoded voice or data signal as input. In one embodiment, an input to WCDMA transmitter 102 may be provided in transport blocks at every transport time interval (TTI) from a higher layer. The WCDMA transmitter 102 may transmits a signal to a WCDMA front end receiver 106.

The analog to digital convertor (ADC) 108 that generates output in the form of input samples. The analog to digital convertor (ADC) 108 transmits the input samples to the sample rate convertor 204. The sample rate convertor 204 converts a sampling rate (e.g., number of samples per unit of time) associated with the input samples (from the analog to digital convertor (ADC) 108) to a desired sampling rate for the rake receiver 112C. In one embodiment, the samples at an output (e.g., have many bits per sample) of an analog to digital convertor (ADC) 108 are sent through the digital to digital sigma-delta converter 206 that provides output with fewer bits per sample. The sigma-delta converter 206 is a digital—digital sigma-delta converter. In one embodiment, the analog to digital convertor (ADC) 108 transmits the input samples directly to the digital to digital sigma-delta converter 206 when the sampling rate of the input samples correspond (e.g., same) to a sampling rate of the rake receiver.

The digital to digital sigma-delta converter 206 converts (e.g., a quantization) the input samples with a first number of bits to a converted data samples with a reduced number of bits. A noise is introduced when the input samples are converted to the converted data samples. The memory unit 110 stores the converted data samples with the reduced number of bits. The filter 208 (e.g., a digital low pass filter) filters the noise from the converted data samples to obtain filtered data samples. A memory associated with storing the reduced number of bits may be lesser than a memory associated with storing the first number of bits. The WCDMA receiver processing unit 112 receives the filtered data samples. The digital to digital sigma-delta converter 206 may convert the input samples with higher number of bits (X bits) to new samples to reduce the memory requirement for storing with some noise.

The digital to digital sigma-delta converter 206 converts the input samples to new samples having lesser number of bits (Y bits). The sample rate at which the digital to digital sigma-delta converter 206 is executed may be associated with the granularity requirement to resolve multiple paths (e.g., 4x-8x, this is considered to be low oversampling ratio (OSR) value for direct sigma delta ADCs whose requirements are based on analog reliability constraints and not the amount of memory required to store the outputs). In one embodiment, a SD modulator reduces the number of bits in one or more samples and most of the additional quantization noise is added at higher frequencies.

Here, since one or more ADC samples are oversampled, there is no signal at higher frequencies and hence the precision reduction and resulting noise addition may not affect the quality of the signal as long as the noise is filtered later. The memory unit 110 is a storage part which allows storing input samples with the lesser number of bits (Y bits). The digital low pass filter 208 may filter the noise that is produced by the digital to digital sigma-delta converter 206. For example, the converted data samples with less number of bits (Y bits) with noise are then processed into the digital low pass filter 208. The digital low pass filter 208 suppresses the noise of the converted data samples with less number of bits (Y bits). The WCDMA receiver processing unit 112 receives processed input samples. The WCDMA receiver processing unit 112 may receive the filtered data samples which are decoded over an entire radio frame. In one embodiment, a radio frame of spread encoded data bits may be transmitted over one or more physical channels. A radio frame includes encoded control bits transmitted in parallel along with the radio frame of spread encoded data bits which is transmitted over one or more physical channels. In one embodiment, the data bits which are encoded and oversampled are communicated to the WCDMA receiver 104.

With reference to FIG. 1A through FIG. 2, FIG. 3 is a graphical representation 300 illustrating frequency spectra at various stages of the WCDMA front end receiver 106 of FIG. 2 according to an embodiment herein. The graphical view 300 includes a frequency spectrum produced from the input samples 302, a frequency spectrum 304 when with a noise is produced from the digital to digital sigma-delta converter 206, and a frequency spectrum 306 after filtering the noise by using the digital low pass filter 208.

The frequency spectrum 302 representing the input samples of the digital to digital sigma-delta converter 206. The frequency spectrum 304 that represents the output samples of the digital to digital sigma-delta converter 206 with noise due to lesser number of bits (Y bits) reducing the memory requirement in the memory unit 110. The samples with less number of bits (Y bits) represented by the frequency spectrum 304 with noise is stored in the memory unit 110 and then input to the digital low pass filter 208. The digital low pass filter 208 filters the frequency spectrum (which includes noise) 304 to produce the frequency spectrum 306 by removing the noise. In one embodiment, the number of bits (Y bits) produced by the digital to digital sigma-delta converter 206, is lesser than the number of bits (X bits) represented by the input samples.

Figure 4:
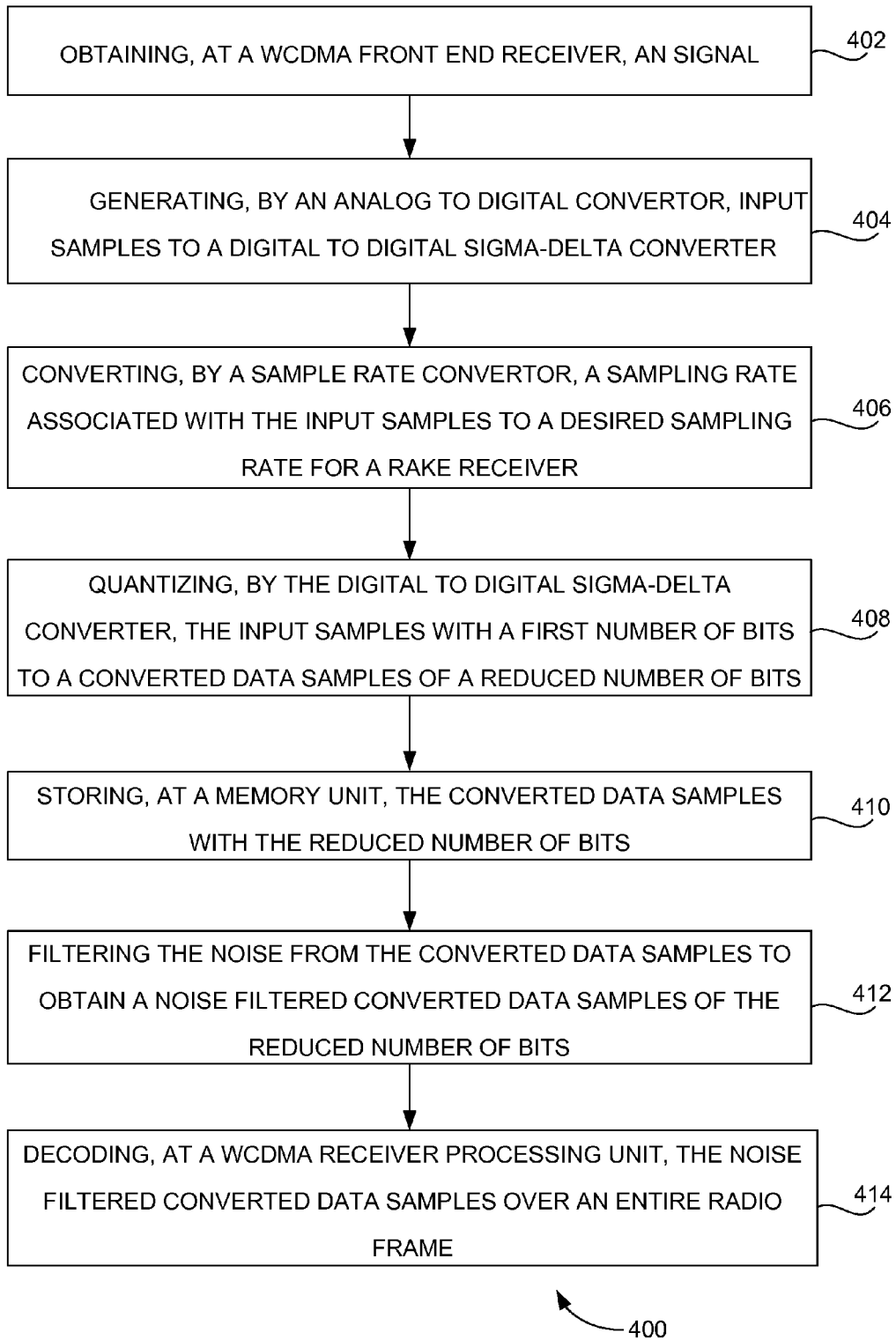
FIG. 4 is a flow diagram illustrating a method for reducing an on-chip memory associated with storing frame buffer in the WCDMA receiver.

FIG. 4 is a flow diagram 400 illustrating a method for reducing an on-chip memory associated with storing frame buffer in the WCDMA receiver 104. In step 402, a signal is obtained at the WCDMA front end receiver 106. In step 404, input samples are generated by the analog to digital convertor 108 to a digital to digital sigma-delta converter. The input samples include one or more bit per input sample. The analog to digital convertor (ADC) 108 transmits the input samples to the sample rate convertor 204. In step 406, a sampling rate associated with the input samples are converted by the sample rate convertor 204 to obtain a desired sampling rate for the rake receiver 112C. In one embodiment, input samples are transmitted to the digital to digital sigma-delta converter 206, when the sampling rate corresponds to a sampling rate of the rake receiver 112C.

In step 408, the input samples with a first number of bits are quantized by the digital to digital sigma-delta converter 206 to converted data samples of a reduced number of bits. A noise is introduced when the input samples are converted to the converted data samples. In step 410, the converted data samples with the reduced number of bits are stored at the memory unit 110. In step 412, the noise is filtered from the converted data samples to obtain a noise filtered converted data samples of the reduced number of bits. In step 414, the noise filtered converted data samples are decoded over an entire radio frame at a WCDMA receiver processing unit 112.

The input samples may be transmitted to the digital to digital sigma-delta converter 206 when the sampling rate corresponds to a sampling rate of the rake receiver 112C. The digital to digital sigma delta converter 206 that converts the input samples to the converted data samples. The input samples may include high number of bits (X bits). The converted data samples may include lesser number of bits (Y bits). A memory associated with storing the reduced number of bits may be lesser than a memory associated with storing the first number of bits. A radio frame of spread encoded data bits may be transmitted over at least one physical channel. The data bits which are encoded and oversampled may be communicated to the WCDMA receiver 104. The noise filtered converted data samples may be decoded over an entire radio frame.

Figure 5:
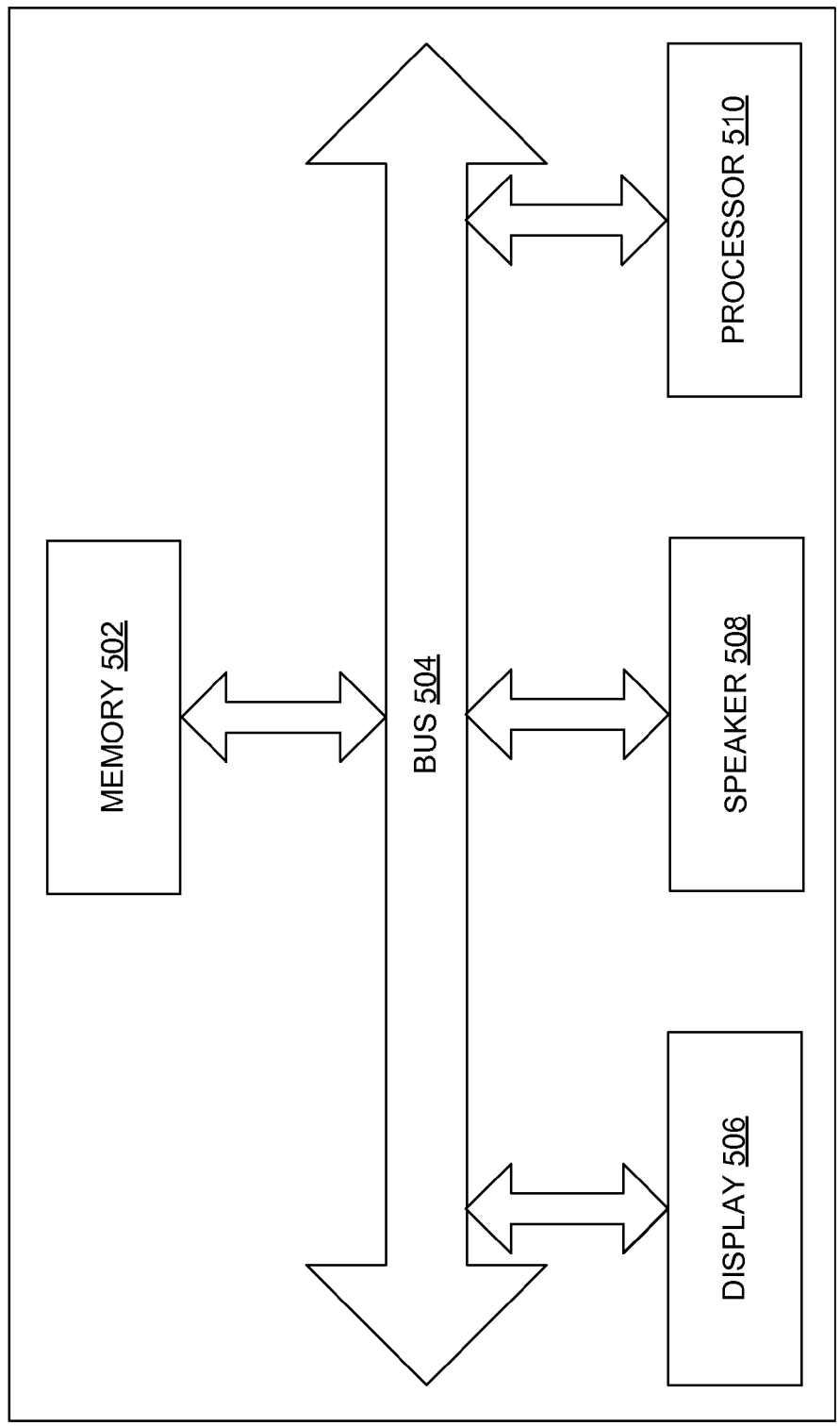
FIG. 5 illustrates an exploded view of a receiver according to the embodiments herein.

FIG. 5 illustrates an exploded view of the receiver having an a memory 502 having a set of computer instructions, a bus 504, a display 506, a speaker 508, and a processor 510 capable of processing a set of instructions to perform any one or more of the methodologies herein, according to an embodiment herein. In one embodiment, the receiver may be a computing device. The processor 510 may also enable digital content to be consumed in the form of video for output via one or more displays 506 or audio for output via speaker and/or earphones 508. The processor 510 may also carry out the methods described herein and in accordance with the embodiments herein.

Digital content may also be stored in the memory 502 for future processing or consumption. The memory 502 may also store program specific information and/or service information (PSI/SI), including information about digital content (e.g., the detected information bits) available in the future or stored from the past. A user of the computing device may view this stored information on display 506 and select an item of for viewing, listening, or other uses via input, which may take the form of keypad, scroll, or other input device(s) or combinations thereof. When digital content is selected, the processor 510 may pass information. The content and PSI/SI may be passed among functions within the personal communication device using the bus 504.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Reducing the number of bits to represent the input samples without degrading the quality of the converted data samples and thereby without any loss in the WCDMA receiver performance. The storage area required in a RAM on a chip is then significantly lesser, hence reducing a silicon area and cost. Realizing a higher order sigma delta is way more implementable in a digital domain. The digital—digital sigma delta converter 206 is lot more easily implementable since transfer function is digital and hence more complex transfer functions/oversampling ratios for the LPF can be chosen with the aim to minimize the bit rate. The digital—digital sigma delta converter 206 helps in maintaining the quality of a data signal. The quantization noise which shows a high pass behavior. This adds very little noise in lower frequencies maintaining the signal to noise ratio of the signal.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A system for reducing an on-chip memory associated with storing frame buffer, said system comprising:
   (i) a WCDMA receiver; wherein said WCDMA receiver comprises:
      (a) a WCDMA front end receiver configured to receive a signal;
      (b) an analog to digital convertor communicatively associated with said WCDMA front end receiver and configured to generate a plurality of digital input samples using said received signal, wherein said plurality of digital input samples comprises at least one bit per input sample;
      (c) a sample rate convertor communicatively associated with said analog to digital converter and configured to convert a sampling rate associated with said plurality of digital input samples to a desired sampling rate for a rake receiver;
      (d) a digital to digital sigma-delta converter communicatively associated with said sample rate converter and configured to quantize said plurality of digital input samples with a first number of bits to a plurality of converted data samples with a second number of bits, wherein said second number of bits (Y bits) is lesser than said first number of bits (X bits), and wherein a noise is introduced when said plurality of digital input samples are quantized to said plurality of converted data samples;
      (e) a memory unit communicatively associated with said digital to digital signal-delta converter and configured to store said converted data samples with said second number of bits, wherein a size of said memory unit associated with storing said second number of bits (Y bits) is lesser than a size of said memory unit associated with storing said first number of bits (X bits); and (f) a digital low pass filter communicatively associated with said memory unit and configured to filter said noise from said plurality of converted data samples with said second number of bits obtained from said memory unit to generate a plurality of noise filtered converted data samples.

2. The system of claim 1, wherein said WCDMA receiver is configured to receive data bits which are encoded and oversampled.

3. The system of claim 1, wherein said WCDMA receiver is configured to decode said noise filtered converted data samples over an entire radio frame.

4. A system for reducing an on-chip memory associated with storing frame buffer in WCDMA receiver, said system comprising:

(i) a WCDMA transmitter that transmits a signal to said WCDMA receiver;

(ii) said WCDMA receiver configured to receive said signal from said WCDMA transmitter, said WCDMA receiver comprising:

(a) a WCDMA front end receiver;

(b) an analog to digital convertor communicatively associated with said WCDMA front end receiver and configured to generate a plurality of digital input samples using said received signal, wherein said plurality of digital input samples comprises at least one bit per input sample;

(c) a sample rate convertor communicatively associated with said analog to digital converter and configure to convert a sampling rate associated with said plurality of digital input samples to a desired sampling rate for a rake receiver;

(d) a digital to digital sigma-delta converter communicatively associated with said sample rate converter and configured to quantize said plurality of digital input samples with a first number of bits to a plurality of converted data samples with a second number of bits, wherein said second number of bits (Y bits) is lesser than said first number of bits (X bits), and wherein a noise is introduced when said plurality of digital input samples are quantized to said plurality of converted data samples;

(e) a memory unit communicatively associated with said digital to digital sigma delta converter and configured to store said plurality of converted data samples with said second number of bits, wherein a size of said memory unit associated with storing said second number of bits (Y bits) is lesser than a size of said memory unit associated with storing said first number of bits (X bits);

(f) a digital low pass filter communicatively associated with said memory unit and configured to filter said noise from said plurality of converted data samples with said second number of bits obtained from said memory unit to generate a plurality of noise filtered converted data samples; and (g) a WCDMA receiver processing unit communicatively associated with said digital low pass filter and configured to receive said noise filtered converted data samples which are decoded over an entire radio frame.

5. A method of reducing an on-chip memory associated with storing frame buffer in WCDMA receiver, said method comprising:

(i) obtaining, at a WCDMA front end receiver, a signal;

(ii) generating, by an analog to digital convertor of said WCDMA receiver, a plurality of digital input samples and transmitting said generated digital input samples to a sample rate converter of said WCDMA receiver, wherein said plurality of digital input samples comprises at least one bit per input sample;

(iii) converting, by said sample rate convertor, a sampling rate associated with said plurality of digital input samples to a desired sampling rate for a rake receiver;

(iv) quantizing, by a digital to digital sigma-delta converter of said WCDMA receiver, said plurality of digital input samples with a first number of bits to a plurality of converted data samples with second number of bits, wherein said second number of bits (Y bits) is lesser than said first number of bits (X bits), and wherein a noise is introduced when said plurality of digital input samples are converted to said plurality of converted data samples;

(v) storing, at a memory unit of said WCDMA receiver, said plurality of converted data samples with said second number of bits, wherein a size of said memory unit associated with storing said second number of bits (Y bits) is lesser than a size of said memory unit associated with storing said first number of bits (X bits);

(vi) filtering, at a digital low pass filter of said WCDMA receiver, said noise from said plurality of converted data samples with said second number of bits to obtain a plurality of noise filtered converted data samples; and (vii) decoding, at a WCDMA receiver processing unit of said WCDMA receiver, said plurality of noise filtered converted data samples over an entire radio frame.

6. The method of claim 5, further comprising, transmitting said plurality of digital input samples to said digital to digital sigma-delta converter, when said sampling rate corresponds to a sampling rate of said rake receiver.

7. The method of claim 5, further comprising, communicating, to said WCDMA receiver, data bits which are encoded and oversampled.

8. The method of claim 5, further comprising, decoding said plurality of noise filtered converted data samples over an entire radio frame.

* * * * *